US009218203B2

(12) United States Patent
Yu et al.

(10) Patent No.: US 9,218,203 B2
(45) Date of Patent: Dec. 22, 2015

(54) PACKET SCHEDULING IN A MULTIPROCESSOR SYSTEM USING INTER-CORE SWITCHOVER POLICY

(71) Applicant: Huawei Technologies Co., Ltd., Shenzhen, Guangdong (CN)

(72) Inventors: Jiaqiang Yu, Shenzhen (CN); Wei Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 209 days.

(21) Appl. No.: 14/143,407

(22) Filed: Dec. 30, 2013

(65) Prior Publication Data

US 2014/0115603 A1    Apr. 24, 2014

Related U.S. Application Data

(63) Continuation of application No. PCT/CN2013/071272, filed on Feb. 1, 2013.

(30) Foreign Application Priority Data

Jun. 28, 2012    (CN) .......................... 2012 1 0217579

(51) Int. Cl.
| | |
|---|---|
| G06F 9/48 | (2006.01) |
| G06F 9/50 | (2006.01) |
| H04L 12/851 | (2013.01) |
| G06F 9/46 | (2006.01) |

(52) U.S. Cl.
CPC ............ *G06F 9/4881* (2013.01); *G06F 9/4812* (2013.01); *G06F 9/505* (2013.01); *H04L 47/2441* (2013.01)

(58) Field of Classification Search
None
See application file for complete search history.

(56) References Cited

U.S. PATENT DOCUMENTS

| | | | |
|---|---|---|---|
| 6,098,105 A | 8/2000 | Desnoyers et al. | |
| 7,761,619 B2 | 7/2010 | Feng et al. | |
| 2006/0047856 A1* | 3/2006 | Tripathi | H04L 67/1002 709/250 |
| 2007/0153796 A1* | 7/2007 | Kesavan | H04L 67/28 370/392 |
| 2008/0109814 A1 | 5/2008 | Park | |
| 2009/0158297 A1 | 6/2009 | Lee et al. | |
| 2009/0248934 A1 | 10/2009 | Ge et al. | |
| 2011/0087814 A1 | 4/2011 | Liu et al. | |
| 2011/0126209 A1 | 5/2011 | Housty | |

FOREIGN PATENT DOCUMENTS

| | | |
|---|---|---|
| CN | 101021830 A | 8/2007 |
| CN | 101021831 A | 8/2007 |
| CN | 101394362 A | 3/2009 |

(Continued)

*Primary Examiner* — Eric C Wai

(57) ABSTRACT

The present invention discloses a method, an apparatus, and a system for scheduling a processor core in a multiprocessor core system, which relate to the field of multiprocessor core systems, and can meet the demand for real-time network I/O processing, thereby improving the efficiency of the multiprocessor core system. The method for scheduling a processor core in a multiprocessor core system includes: obtaining, in the running process of the multiprocessor core system, a first control parameter, a second control parameter, a third control parameter, and a fourth control parameter; transferring a packet of a data flow that enters the multiprocessor core system to an idle processor core for processing based on the first control parameter, the second control parameter, and the third control parameter; and switching over the processor core in the multiprocessor core system between an interruption mode and a polling mode based on the fourth control parameter.

17 Claims, 10 Drawing Sheets

(56) References Cited

FOREIGN PATENT DOCUMENTS

| | | |
|---|---|---|
| CN | 101706743 A | 5/2010 |
| CN | 101770401 A | 7/2010 |
| CN | 101968748 A | 2/2011 |
| CN | 102411510 A | 4/2012 |
| CN | 102779075 A | 11/2012 |
| KR | 1020090061955 A | 6/2009 |

* cited by examiner

PACKET SCHEDULING IN A MULTIPROCESSOR SYSTEM USING INTER-CORE SWITCHOVER POLICY

CROSS-REFERENCE TO RELATED APPLICATIONS

This application is a continuation of International Application No. PCT/CN2013/071272, filed on Feb. 1, 2013, which claims priority to Chinese Patent Application No. 201210217579.8, filed on Jun. 28, 2012, both of which are hereby incorporated by reference in their entirety.

TECHNICAL FIELD

The present invention relates to the field of a multiprocessor core system, and in particular, to a method, an apparatus, and a system for scheduling a processor core in a multiprocessor core system.

BACKGROUND

At present, services integrated into a multiprocessor core system are increasing gradually, and network I/O (input/output, input/output) requests are also increasing. The data processing capability of the multiprocessor core system to network I/O requests plays a key role for the system to exert its full capability. In the prior art, one method for processing network I/O requests is: based on a static-configuration processing mode, binding a task to a designated processor core, where the task is performed on the designated processor core, or assigning the tasks on idle processor cores in a balanced manner, where the tasks are performed on the idle processor cores; another method for processing network I/O requests is: based on a static-configuration switchover rule, switching over the processor core between an interruption mode and a polling mode to improve the processing efficiency of the system to the network I/O requests.

During implementation of the foregoing technical solution, the inventor finds that the prior art faces at least the following challenges: static configuration refers to manual configuration prior to the running process of the system, and during the actual running process of the system, since a processor core is scheduled based on the static configuration solution, the demand for real-time network I/O processing cannot be met and a reasonable solution of scheduling a processor core cannot be provided, thereby failing to improve the efficiency of the overall multiprocessor core system.

SUMMARY

Embodiments of the present invention provide a method, an apparatus, and a system for scheduling a processor core in a multiprocessor core system, which can meet the demand for real-time network I/O processing, thereby improving the efficiency of the overall multiprocessor core system.

Embodiments of the present invention adopt the following technical solutions:

A method for scheduling a processor core in a multiprocessor core system includes:

obtaining, in a running process of the multiprocessor core system, a first control parameter, a second control parameter, a third control parameter, and a fourth control parameter, where the first control parameter refers to indication information of N data flows, and the N data flows refer to the first N data flows obtained in a first sampling cycle by sorting data flows, which contain packets processed by the multiprocessor core system, in descending order according to the number of the processed packets contained in each data flow, where N is a positive integer; the second control parameter refers to an internal transmission duration of each data flow in the multiprocessor core system and a duration for processing each data flow by a processor core in the multiprocessor core system; the third control parameter refers to processor core information of the processor core with the lowest usage; and the fourth control parameter refers to application (APP) critical path description information of each data flow;

detecting whether a data flow where a current packet belongs is one of the N data flows based on the first control parameter;

when the data flow where the current packet belongs is not one of the N data flows, transferring, based on the second control parameter and the third control parameter and according to an inter-core switchover policy, a packet of the data flow that enters the multiprocessor core system to an idle processor core for processing, where the inter-core switchover policy is that: if the internal transmission duration exceeds a duration for processing the packet by the processor core, the packet is processed by the processor core with the lowest usage, and if the duration for processing a packet by the processor core exceeds the internal transmission duration, the packet is bound to a designated processor core for processing; and switching over the processor core that processes the packet in the multiprocessor core system between an interruption mode and a polling mode based on the fourth control parameter and according to an intra-core switchover policy, where the intra-core switchover policy is that: if an overall polling overhead is greater than an overall interruption overhead, the processor core enters the interruption mode to process the packet, and if the overall polling overhead is less than the overall interruption overhead, the processor core enters the polling mode to process the packet.

A computer system includes:
a bus;
a multiprocessor core coupled with the bus; and
a memory coupled with the bus, where
by calling an execution instruction in the memory through the bus, the multiprocessor core is configured to: obtain a first control parameter, a second control parameter, a third control parameter, and a fourth control parameter based on the data called from the memory, where the first control parameter refers to indication information of N data flows, and the N data flows refer to the first N data flows obtained in a first sampling cycle by sorting data flows, which contain packets processed by the multiprocessor core system, in descending order according to the number of the processed packets contained in each data flow, where N is a positive integer; the second control parameter refers to an internal transmission duration of each data flow in the multiprocessor core system and a duration for processing each data flow by a processor core in the multiprocessor core system; the third control parameter refers to processor core information of the processor core with the lowest usage; and the fourth control parameter refers to application (APP) critical path description information of each data flow;

the multiprocessor core is further configured to detect whether a data flow where a current packet belongs is one of the N data flows based on the first control parameter;

the multiprocessor core is further configured to: when the data flow where the current packet belongs is not one of the N data flows, transfer, based on the second control parameter and the third control parameter and according to an inter-core switchover policy, the packet of the data flow that enters the multiprocessor core system to an idle processor core for processing, where the inter-core switchover policy is that: if the internal transmission duration exceeds a duration for processing the packet by the processor core, the packet is processed by the processor core with the lowest usage, and if the duration for processing the packet by the processor core exceeds the internal transmission duration, the packet is bound to a designated processor core for processing; and the multiprocessor core is further configured to switch over the processor core that processes the packet in the multiprocessor core system between an interruption mode and a polling mode based on the fourth control parameter and according to an intra-core switchover policy, where the intra-core switchover policy is that: if the overall polling overhead is greater than the overall interruption overhead, the processor core enters the interruption mode to process the packet, and if the overall polling overhead is less than the overall interruption overhead, the processor core enters the polling mode to process the packet.

In the method, apparatus, and system for scheduling a processor core in a multiprocessor core system that are provided by the embodiments of the present invention, by obtaining a first control parameter, a second control parameter, a third control parameter, and a fourth control parameter in the running process of the multiprocessor core system and by scheduling a processor core based on the control parameters, the demand for real-time network I/O processing in the multiprocessor core system can be met, thereby the efficiency of the overall multiprocessor core system can be improved.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
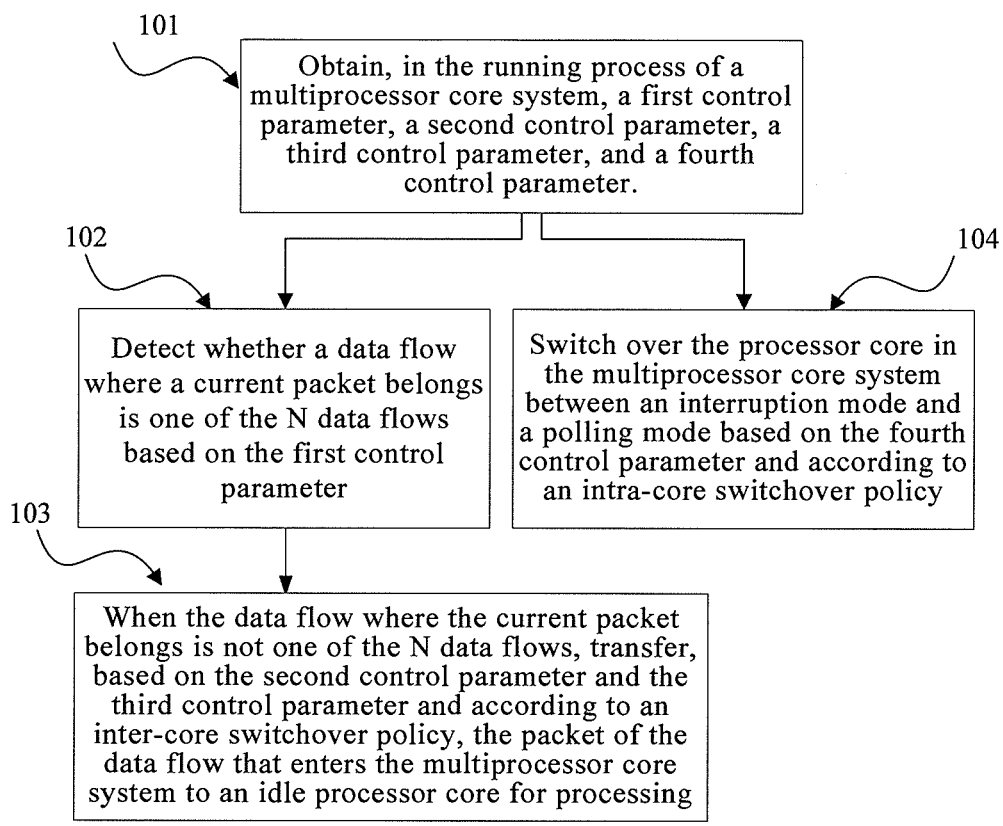
FIG. 1 is a flowchart of a method for scheduling a processor core in a multiprocessor core system according to Embodiment 1 of the present invention.

An embodiment of the present invention provides a method for scheduling a processor core in a multiprocessor core system, as shown in FIG. 1, which includes the following steps.

101. Obtain, in the running process of a multiprocessor core system, a first control parameter, a second control parameter, a third control parameter, and a fourth control parameter.

The first control parameter refers to indication information of N data flows, and the N data flows refer to the first N data flows obtained in a first sampling cycle by sorting data flows, which contain packets processed by the multiprocessor core system, in descending order according to the number of the processed packets contained in each data flow, where N is a positive integer. The indication information of the N data flows may indicate which N data flows are indicated by the indication information.

The second control parameter refers to an internal transmission duration of each data flow in the multiprocessor core system and a duration for processing each data flow by a processor core in the multiprocessor core system. The third control parameter refers to processor core information of the processor core with the lowest usage. The fourth control parameter refers to APP (Application) critical path description information of each data flow.

The first sampling cycle may be a preset sampling cycle or a dynamically obtained sampling cycle. For example, it may be a sampling cycle dynamically configured by a subscriber, which is obtained through a human-computer interaction interface, or it may be a corresponding sampling cycle stored in a database, which is accessed through a communication interface.

102. Detect whether a data flow where a current packet belongs is one of the N data flows based on the first control parameter.

103. When the data flow where the current packet belongs is not one of the N data flows, transfer, based on the second control parameter and the third control parameter and according to an inter-core switchover policy, the packet of the data flow that enters the multiprocessor core system to an idle processor core for processing.

The idle processor core includes the processor core with the lowest usage and a processor core whose resource usage is lower than a certain threshold, where the certain threshold may be a preset threshold in the system or a dynamically configured threshold input by a subscriber as required through a human-computer interaction interface.

Specifically, at first, whether a data flow where a current packet belongs is one of the N data flows is detected based on the first control parameter; when the data flow where the current packet belongs is not one of the N data flows, based on the second control parameter and the third control parameter and according to an inter-core switchover policy, the packet of the data flow that enters the multiprocessor core system is transferred to an idle processor core for processing.

104. Switch over the processor core in the multiprocessor core system between an interruption mode and a polling mode based on the fourth control parameter and according to an intra-core switchover policy.

For a packet of each data flow that enters the multiprocessor core system, steps 102 and 103 are performed to assign a processor core to each packet; step 104 is a switchover of an intra-core processing mode for a single processor core. In actual application, the foregoing steps 102 and 103 are independent actions of step 104, which may be performed simultaneously or separately.

In the embodiment of the present invention, the transferring, based on the second control parameter and the third control parameter, the packet of the data flow that enters the multiprocessor core system to an idle processor core for processing is specifically transferring, according to the inter-core switchover policy, the packet of the data flow that enters the multiprocessor core system to an idle processor core for processing. The inter-core switchover policy is that: if the internal transmission duration of a packet exceeds a duration for processing the packet by the processor core, the packet is processed by the processor core with the lowest usage, and if the duration for processing a packet by the processor core exceeds the internal transmission duration of the packet, the packet is bound to a designated processor core for processing;

In addition, the switchover between the interruption mode and the polling mode of the processor core in the multiprocessor core system based on the fourth control parameter according to the embodiment of the present invention specifically refers to the switchover between the interruption mode and the polling mode of the processor core in the multiprocessor core system according to the intra-core switchover policy. The intra-core switchover policy is that: if the overall polling overhead is greater than the overall interruption overhead, the processor core enters the interruption mode to process the packet, and if the overall polling overhead is less than the overall interruption overhead, the processor core enters the polling mode to process the packet.

In the embodiment of the present invention, different network I/O data flows are distinguished by a quintuple (a source address, a target address, a source port, a target port, and a transmission protocol of a data flow).

The embodiment of the present invention provides a method for scheduling a processor core in a multiprocessor core system, where, by obtaining a first control parameter, a second control parameter, a third control parameter, and a fourth control parameter in the running process of the multiprocessor core system and by scheduling a processor core based on the control parameters, the demand for real-time network I/O processing in the multiprocessor core system can be met, thereby the efficiency of the overall multiprocessor core system can be improved.

Embodiment 2

Figure 2:
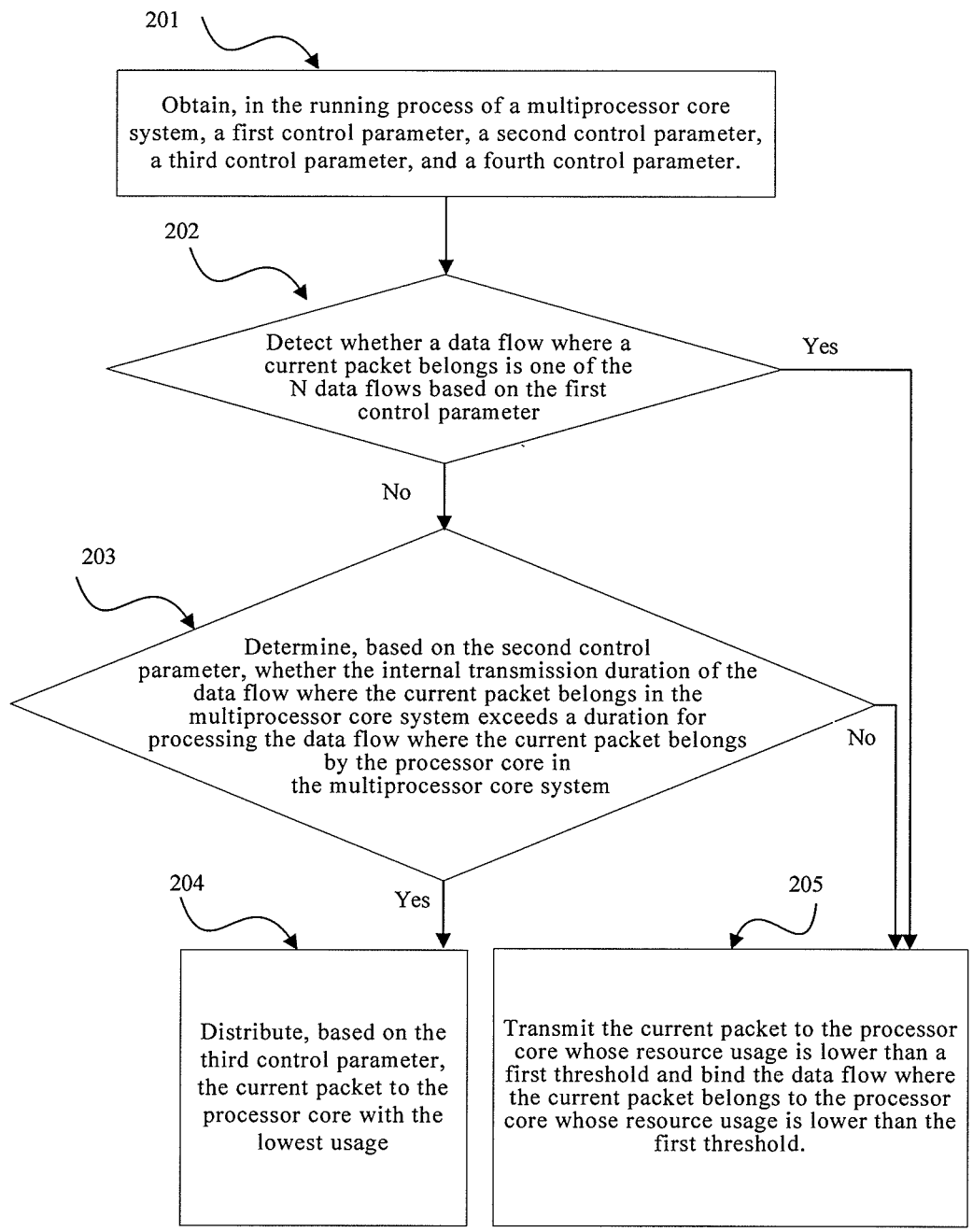
FIG. 2 is a flowchart of a method for scheduling a processor core in a multiprocessor core system according to Embodiment 2 of the present invention.

An embodiment of the present invention provides a method for scheduling a processor core in a multiprocessor core system, as shown in FIG. 2, the method includes:

201. Obtain, in the running process of a multiprocessor core system, a first control parameter, a second control parameter, a third control parameter, and a fourth control parameter.

The first control parameter refers to indication information of N data flows, and the N data flows refer to the first N data flows obtained in a first sampling cycle by sorting data flows, which contain packets processed by the multiprocessor core system, in descending order according to the number of the processed packets contained in each data flow, where N is a positive integer. The indication information of the N data flows may indicate which N data flows are indicated by the indication information. For example, when the value of N is 3, the indication information of the N data flows is: (flow1 flow5, flow6), which shows that the indication information indicates three data flows, and these three data flows are flow1, flow5, and flow6.

The second control parameter refers to an internal transmission duration of each data flow in the multiprocessor core system and a duration for processing each data flow by a processor core in the multiprocessor core system. The third control parameter refers to processor core information of the processor core with the lowest usage. The fourth control parameter refers to APP critical path description information of each data flow.

202. After the current packet of the data flow enters the multiprocessor core system, detect whether a data flow where a current packet belongs is one of the N data flows based on the first control parameter.

After the current packet of the data flow enters the multiprocessor core system, whether a data flow where a current packet belongs is one of the N data flows indicated by the indication information of the N data flows is detected based on the first control parameter. If the data flow where the current packet belongs is one of the N data flows, step 205 is performed. Otherwise, step 203 is performed.

The first sampling cycle may be a preset sampling cycle or a dynamically obtained sampling cycle. For example, it may be a sampling cycle dynamically configured by a subscriber, which is obtained through a human-computer interaction interface, or it may be a corresponding sampling cycle stored in a database, which is accessed through a communication interface.

The actions to obtain the first control parameter may be: first, obtain the packet processed by the multiprocessor core system in the first sampling cycle; then, determine the relationship between the packet processed by the multiprocessor core system and the data flow where the packet belongs; sort the number of packets processed by the multiprocessor core system in descending order, and determine the data flows containing the first N packets according to the foregoing sequence, based on the relationship between the packet processed by the multiprocessor core system and the data flow where the packet belongs.

The following example describes how to obtain the first control parameter. It is assumed that there are data flows, including flow1, flow2, flow3, flow4, and flow5. N=3. When the packet of each data flow enters the multiprocessor core system, the processed packet is recorded in the first sampling cycle. Then, the relationship between the packet processed by the multiprocessor core system and the data flow where the packet belongs is determined and the number of packets processed by the multiprocessor core system is sorted in descending order. If the recorded sorting result is that: the packet of flow1 which enters the system is processed for the most times, the packet of flow2 is processed for the second most times, and the packet of flow3 is processed for the least times. Accordingly, the first control parameter records flow1, flow2, and flow3.

203. Determine, based on the second control parameter, whether the internal transmission duration of the data flow where the current packet belongs in the multiprocessor core system exceeds the duration for processing the data flow where the current packet belongs by the processor core in the multiprocessor core system.

If the internal transmission duration of the data flow where the current packet belongs in the multiprocessor core system exceeds the duration for processing the data flow where the current packet belongs by the processor core in the multiprocessor core system, step 204 is performed. Otherwise, step 205 is performed.

204. Distribute, based on the third control parameter, the current packet to the processor core with the lowest usage.

205. Transmit the current packet to the processor core whose resource usage is lower than the first threshold and bind the data flow where the current packet belongs to the processor core whose resource usage is lower than the first threshold.

The data flow where the current packet belongs is bound to the processor core whose resource usage is lower than the first threshold so that when the packet of the data flow where the current packet belongs enters the multiprocessor core system, it is processed by the processor core whose resource usage is lower than the first threshold.

The first threshold in the embodiment of the present invention may be set based on the actual application scenario.

The foregoing steps 201 to 205 are the embodiment of the inter-core switchover policy, which realizes load scheduling among a plurality of processor cores, thereby reducing the waste of processor core resources and improving the efficiency and capability of the multiprocessor core.

The obtaining of the second control parameter may be: for packets of different data flows, setting time tags when a packet enters the multiprocessor core system and when it leaves the multiprocessor core system to obtain the internal transmission duration of the packet in the multiprocessor core system; on the other hand, recording the time when the processor core starts to process and finishes processing the packet to obtain the duration for processing the packet by the processor core. In actual application, the internal transmission durations of a plurality of packets of a data flow and the durations for respectively processing the plurality of packets by the processor core are obtained respectively. The arithmetic means of the internal transmission durations and the durations for processing the plurality of packets by the processor core are calculated respectively as the internal transmission duration of each data flow in the multiprocessor core system and the duration for processing each data flow by the processor core. The data flows that take longer time to be processed by the processor core are bound to the processor core. This may avoid excessive inter-core switchovers and may fully utilize the calculation capability of the processor core to improve processing efficiency. The data flows whose internal transmission durations are longer are distributed to the processor core with low usage to alleviate network processing pressure.

The obtaining the third control parameter may be: setting a task whose priority level is only higher than the priority level of the idle state in the multiprocessor core system, and regularly checking in which processor core this task lies, and this processor core is deemed as the processor core with the lowest usage.

It should be noted that, apart from the foregoing manner in the embodiment of the present invention, other manners known in the art may also be used to obtain the internal transmission duration of each data flow in the multiprocessor core system and the duration for processing each data flow by the processor core, and to obtain processor core information of the processor core with the lowest usage, which are not described herein again.

Figure 3A:
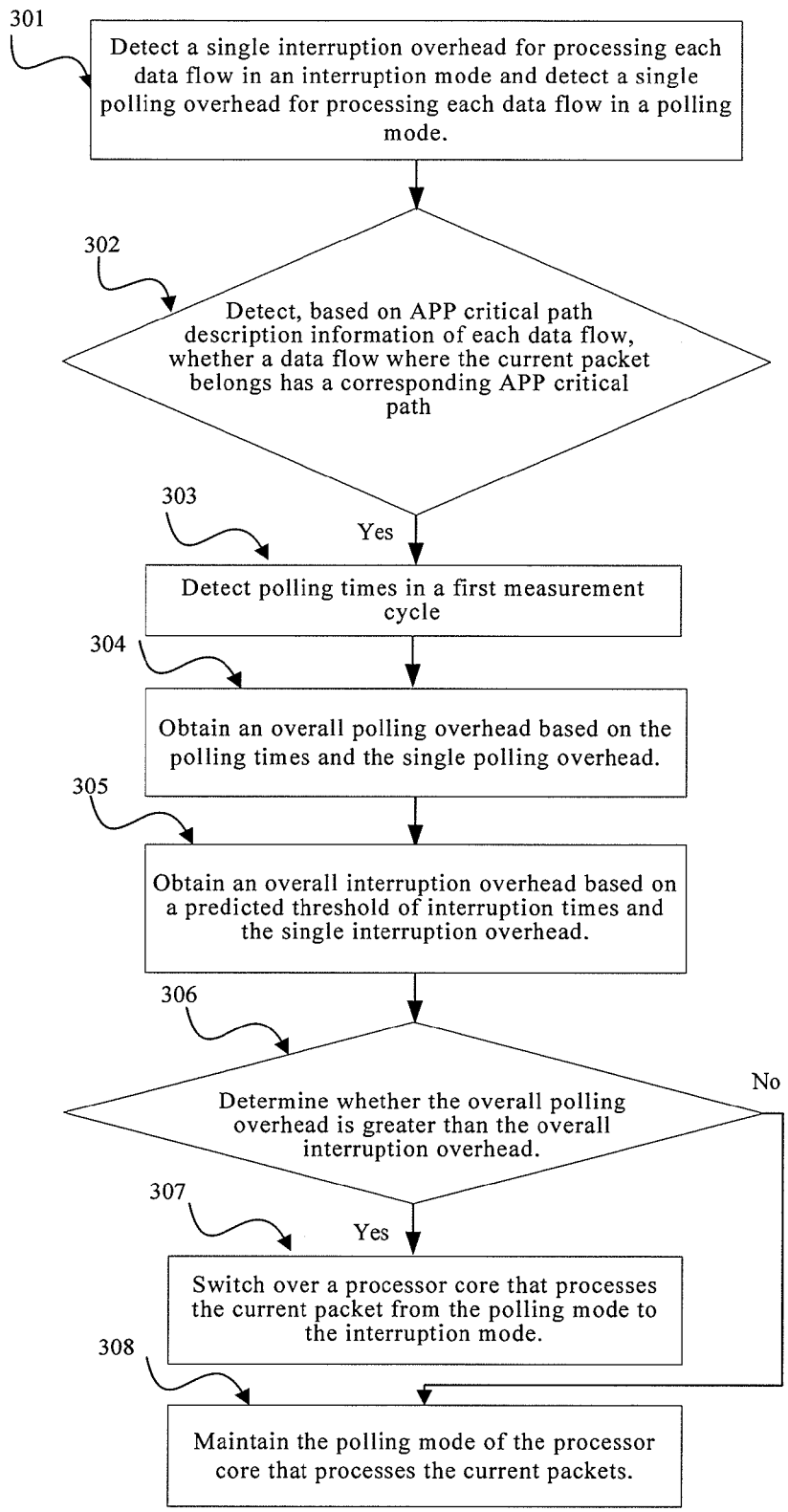
FIG. 3a is a flowchart of another method for scheduling a processor core in a multiprocessor core system according to Embodiment 2 of the present invention.

On the other hand, based on the obtained fourth control parameter, the embodiment of the present invention further provides a method for scheduling a processor core in a multiprocessor core system, as shown in FIG. 3a, including:

301. Detect a single interruption overhead for processing each data flow in an interruption mode and detect a single polling overhead for processing each data flow in a polling mode.

During the initialization of the multiprocessor core system, the single interruption overhead for processing each data flow in the interruption mode and the single polling overhead for processing each data flow in the polling mode are detected respectively. Specifically, for the interruption overhead, a counter is configured to detect the duration for an interruption whenever an interruption action occurs on the processor core; for the polling overhead, a counter is configured to detect the duration for an invalid polling action. Then, based on the detected interruption times per second and the invalid polling times per second, the durations of the interruption overhead and the polling overhead in one second may be respectively calculated.

302. Detect, based on APP critical path description information of each data flow, whether the data flow where the current packet belongs has a corresponding APP critical path.

The fourth control parameter is APP critical path description information of each data flow. Each APP critical path description information indicates that its corresponding data flow has an APP critical path. For example, the APP critical path description information may be represented by a variable APP_flag. If the corresponding APP_flag value of the data flow flow1 is not zero, it indicates that the data flow flow1 has the APP critical path.

If the data flow where the current packet belongs does not have the APP critical path, the processing status of the processor core that processes the current packet is maintained.

If the data flow of the current packet has a corresponding APP critical path, the embodiment of the present invention has different implementation procedures depending on whether the processor core that processes the current packet is in the polling mode or the interruption mode. The following steps 303 to 308 use the processor core in the polling mode as an example.

303. Detect polling times in a first measurement cycle.

The first measurement cycle is preset as required. It should be ensured that the packet processing frequency by the processor core is in a comparatively stable status within the first measurement cycle.

304. Obtain an overall polling overhead based on the polling times and the single polling overhead.

The polling times and the single polling overhead are multiplied to obtain the overall polling overhead.

305. Obtain an overall interruption overhead based on a predicted threshold of the interruption times and the single interruption overhead.

The predicted threshold of the interruption times is a preset value, and the predicted threshold of the interruption times predicts the interruption times in the first measurement cycle and is multiplied by the single interruption overhead to obtain the overall interruption overhead.

It should be noted that, the execution sequence of step 304 and step 305 may be interchanged.

306. Determine whether the overall polling overhead is greater than the overall interruption overhead.

If the overall polling overhead is greater than the overall interruption overhead, step 307 is performed. Otherwise, step 308 is performed.

307. Switch over the processor core that processes the current packet from the polling mode to the interruption mode.

308. Maintain the polling mode of the processor core that processes the current packet.

Figure 3B:
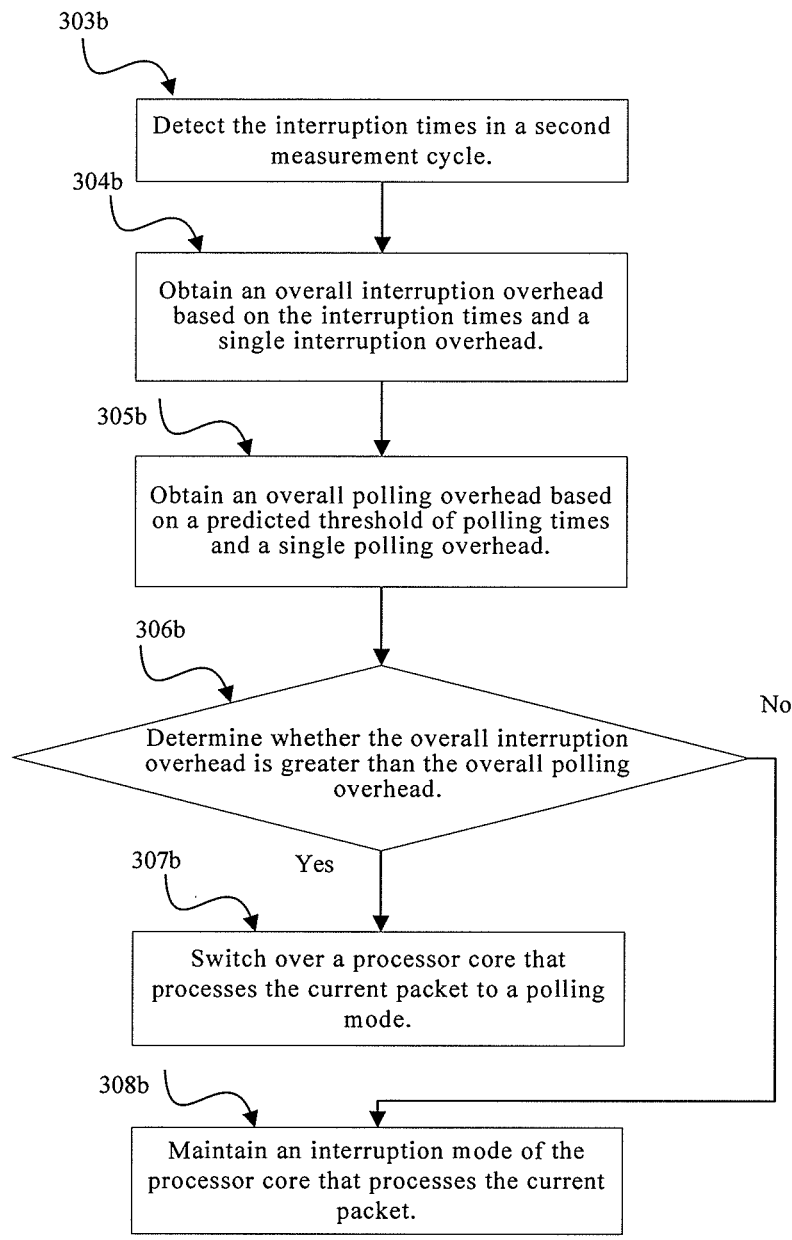
FIG. 3b is a flowchart of another method for scheduling a processor core in a multiprocessor core system according to Embodiment 2 of the present invention.

The foregoing steps 303 to 308 use the processor core in the polling mode as an example. For a processor core in the interruption mode, the operations are similar to the steps 303 to 308. Specifically, if the processor core that processes the current packet is in the interruption mode, as shown in FIG. 3b, the process is as follows:

303b. Detect the interruption times in a second measurement cycle.

The second measurement cycle is preset as required. It should be ensured that the packet processing frequency by the processor core is in a comparatively stable status within the second measurement cycle. The duration of the second measurement cycle may be identical to that of the first measurement cycle.

304b. Obtain the overall interruption overhead based on the interruption times and the single interruption overhead.

305b. Obtain the overall polling overhead based on the predicted threshold of the polling times and the single polling overhead.

The predicted threshold of the polling times is a preset value, and the predicted threshold of the polling times predicts the polling times in the second measurement cycle and is multiplied by the single polling overhead to obtain the overall polling overhead.

It should be noted that, the execution sequence of step 304b and step 305b may be interchanged.

306b. Determine whether the overall interruption overhead is greater than the overall polling overhead.

If the overall interruption overhead is greater than the overall polling overhead, step 307b is performed. Otherwise, step 308b is performed.

307b. Switch over the processor core that processes the current packet to the polling mode.

308b. Maintain the interruption mode of the processor core that processes the current packet.

The foregoing steps 301 to 308 and steps 303b to 308b are specific implementation of the intra-core switchover policy, and the switchover of the processor core between the interruption mode and the polling mode reduces the waste of processor core resources and improves the efficiency and capability of the multiprocessor core.

Figure 4:
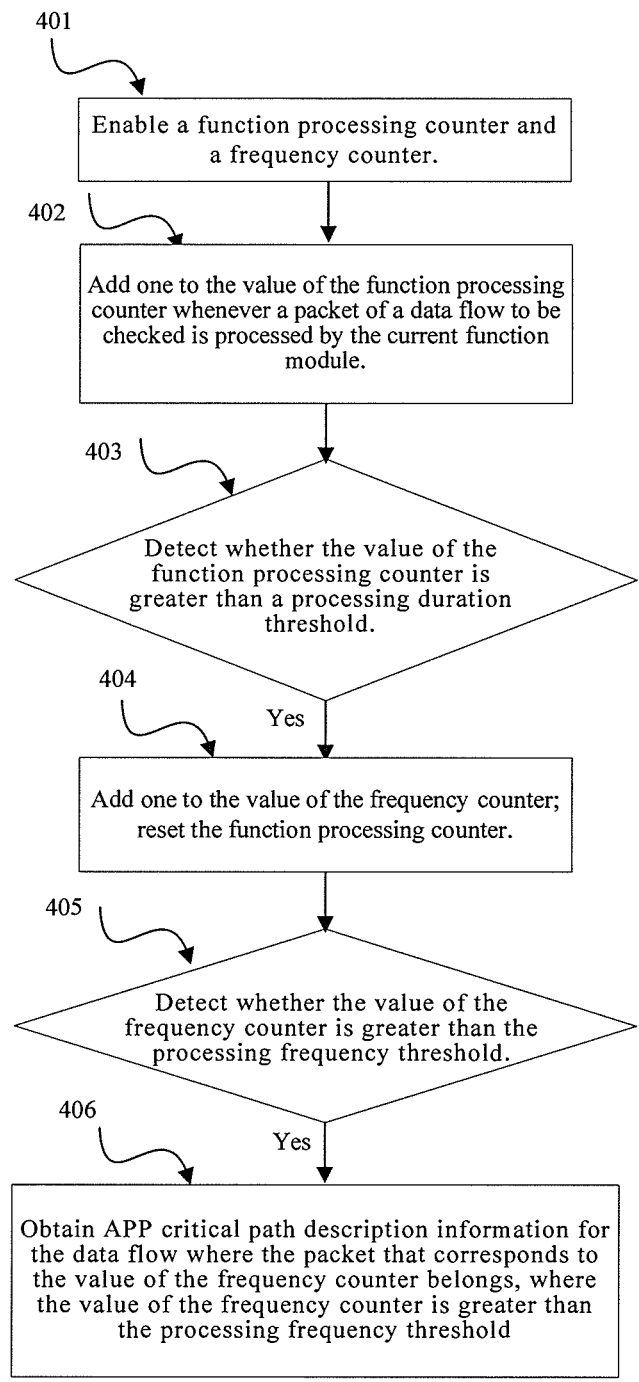
FIG. 4 is a flowchart of obtaining APP critical path description information according to Embodiment 2 of the present invention.

The following FIG. 4 illustrates how to determine whether a data flow has an APP critical path and how to obtain APP critical path description information, including:

401. Enable a function processing counter and a frequency counter.

Before the multiprocessor core system is enabled, thresholds are manually set for the function processing counter and the frequency counter: a processing duration threshold and a processing frequency threshold. The processing duration threshold and the processing frequency threshold set a rule for setting the APP critical path.

402. Add one to the value of the function processing counter whenever the packet of a data flow to be detected is processed by the current function module.

403. Detect whether the value of the function processing counter is greater than the processing duration threshold.

When the value of the function processing counter is greater than the processing duration threshold, step 404 is performed. When the value of the function processing counter is not greater than the processing duration threshold, the detection is proceeded with if the processing of the data flow to be detected is not finished, and the values of the function processing counter are accumulated.

404. Add one to the value of the frequency counter; reset the function processing counter.

405. Detect whether the value of the frequency counter is greater than the processing frequency threshold.

When the value of the frequency counter is greater than the processing frequency threshold, step 406 is performed. When the value of the frequency counter is not greater than the processing frequency threshold, the detection is proceeded with if the processing of the data flow to be detected is not finished.

406. Obtain APP critical path description information for the data flow where the packet that corresponds to the value of the frequency counter belongs, where the value of the frequency counter is greater than the processing frequency threshold.

If the value of the function processing counter is not greater than the processing duration threshold or the value of the frequency counter is not greater than the processing frequency threshold when the processing of the data flow to be detected is finished, or if the value of the function processing counter is not greater than the processing duration threshold or the value of the frequency counter is not greater than the processing frequency threshold when the first detection cycle ends, it may be deemed that no APP critical path exists, and the action to obtain the APP critical path description information is skipped.

The following example is used to describe the foregoing steps 401 to 406. After the packet enters the multiprocessor core system, it may be processed by a plurality of function modules in the processor core. For example, after the packet of the data flow flow1 enters the multiprocessor core system, it is processed by the function modules, function1, function2, and function3 one by one. Accordingly, the corresponding processing path of flow1 is: function1-function2-function3. At the same time, it is assumed that: the corresponding processing path of flow2 is: function1-function3; and the corresponding processing path of flow3 is function1-function2-function3-function4. If the preset processing duration threshold is 3 and the preset processing frequency threshold is 1, it may be determined that the value of the corresponding function processing counter is 3 when the function module finishes processing flow1. This value is not greater than the processing duration threshold. Therefore, the APP critical path does not exist; similarly, flow2 does not have the APP critical path either. After Flow3 is processed by the function modules of its corresponding processing path, the value of the corresponding function processing counter is 4. At this time, the frequency counter performs a plus-one operation, and the value is 1, and the function processing counter whose value is 4 is reset. Then, if the packet of flow3 enters the system again and after it is processed by the function modules, the value of the frequency counter becomes 2. At this time, for flow3, the value of the frequency counter (the value is 2) is greater than the processing frequency threshold. An APP critical path exists for flow3. Accordingly, the corresponding APP critical path information is obtained for flow3 in the multiprocessor core system. If the packet of flow3 does not enter the system again, and is not processed by the function modules, and the value of its frequency counter is not greater than the processing frequency threshold, no APP critical path exists for flow3 and the action to obtain the corresponding APP critical path description information for flow3 is skipped.

In the embodiment of the present invention, the data flows are distinguished by a quintuple (a source address, a target address, a source port, a target port, and a transmission protocol of a data flow).

The processor core in the multiprocessor core system according to the embodiment of the present invention may be a CPU, an MCU, or a DSP, and so on. In the multiprocessor core system, the numerous processor cores simultaneously switch over and schedule their own intra-core and inter-core tasks.

The embodiment of the present invention provides a method for scheduling a processor core in a multiprocessor core system, where, by obtaining a first control parameter, a second control parameter, a third control parameter, and a fourth control parameter in the running process of the multiprocessor core system, by realizing load scheduling among a plurality of processor cores based on the first control parameter, the second control parameter, and the third control parameter, and by realizing a switchover between an interruption mode and a polling mode of a single processor core based on the fourth control parameter, the demand for real-time network I/O processing in the multiprocessor core system can be met, thereby the efficiency of the overall multiprocessor core system can be improved. The load scheduling specially contrived for a multiprocessor core environment avoids the problem that in a traditional configuration scheduling mode, it is difficult to make a reasonable scheduling selection so that the efficiency and capability of a multiprocessor core fail to be fully utilized. In addition, this method simplifies the manual configuration of the network I/O of the multiprocessor core by an engineer or a subscriber, which improves the software deployment efficiency on a multicore platform.

Embodiment 3

Figure 5:
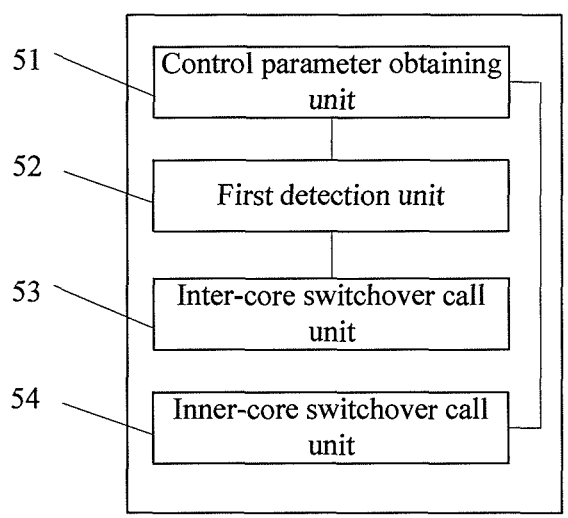
FIG. 5 is a block diagram of an apparatus for scheduling a processor core in a multiprocessor core system according to Embodiment 3 of the present invention.

An embodiment of the present invention provides an apparatus for scheduling a processor core in a multiprocessor core system, as shown in FIG. 5, including: a control parameter obtaining unit 51, a first detection unit 52, an inter-core switchover scheduling unit 53, and an intra-core switchover scheduling unit 54.

The control parameter obtaining unit 51 is configured to obtain, in the running process of a multiprocessor core system, a first control parameter, a second control parameter, a third control parameter, and a fourth control parameter.

The first control parameter refers to indication information of N data flows, and the N data flows refer to the first N data flows obtained in a first sampling cycle by sorting data flows, which contain packets processed by the multiprocessor core system, in descending order according to the number of the processed packets contained in each data flow, where N is a positive integer. The indication information of the N data flows may indicate which N data flows are indicated by the indication information.

The second control parameter refers to an internal transmission duration of each data flow in the multiprocessor core system and a duration for processing each data flow by a processor core in the multiprocessor core system. The third control parameter refers to processor core information of the processor core with the lowest usage. The fourth control parameter refers to APP critical path description information of each data flow.

The first detection unit 52 is configured to detect whether a data flow where a current packet belongs is one of the N data flows based on the first control parameter.

The inter-core switchover scheduling unit 53 is configured to: when the data flow where the current packet belongs is not one of the N data flows, transfer, based on the second control parameter and the third control parameter and according to an inter-core switchover policy, the packet of the data flow that enters the multiprocessor core system to an idle processor core for processing.

The inter-core switchover policy is that: if the internal transmission duration of a packet exceeds a duration for processing the packet by the processor core, the packet is processed by the processor core with the lowest usage, and if the duration for processing a packet by the processor core exceeds the internal transmission duration of the packet, the packet is bound to a designated processor core for processing.

The intra-core switchover scheduling unit 54 is configured to switch over the processor core that processes the packet in the multiprocessor core system between an interruption mode and a polling mode based on the fourth control parameter and according to an intra-core switchover policy.

The intra-core switchover policy is that: if the overall polling overhead is greater than the overall interruption overhead, the processor core enters the interruption mode to process the packet, and if the overall polling overhead is less than the overall interruption overhead, the processor core enters the polling mode to process the packet.

The idle processor core includes the processor core with the lowest usage and a processor core whose resource usage is lower than a certain threshold, where the certain threshold may be a preset threshold in the system or a dynamically configured threshold input by a subscriber as required through a human-computer interaction interface.

Figure 6:
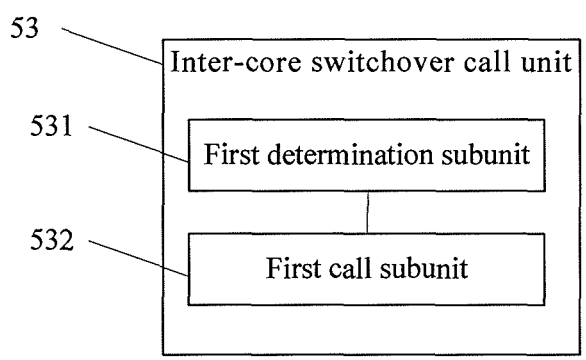
FIG. 6 is a block diagram of an inter-core switchover scheduling unit according to Embodiment 3 of the present invention.

Further, as shown in FIG. 6, the inter-core switchover scheduling unit 53 specifically further includes a first determination subunit 531 and a first scheduling subunit 532.

The first determination subunit 531 is configured to determine, based on the second control parameter, whether the internal transmission duration of the data flow where the current packet belongs in the multiprocessor core system exceeds the duration for processing the data flow where the current packet belongs by the processor core in the multiprocessor core system.

The first scheduling subunit 532 is configured to distribute, based on the third control parameter, the current packet to the processor core with the lowest usage in the multiprocessor core system when the first detection unit 52 detects that the data flow where the current packet belongs is not one of the N data flows and the internal transmission duration of the data flow where the current packet belongs in the multiprocessor core system exceeds the duration for processing the data flow where the current packet belongs by the processor core in the multiprocessor core system.

Figure 7:
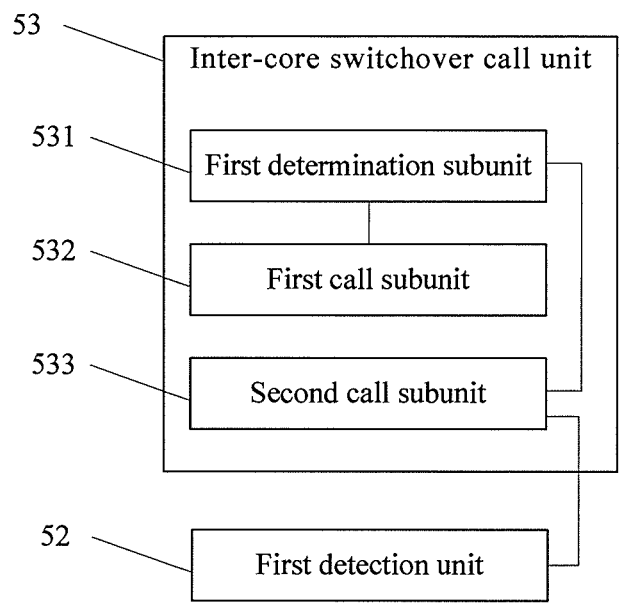
FIG. 7 is a block diagram of another inter-core switchover scheduling unit according to Embodiment 3 of the present invention.

Further, as shown in FIG. 7, the inter-core switchover scheduling unit 53 further includes a second scheduling subunit 533, configured to transmit the current packet to the processor core whose resource usage is lower than the first threshold and bind the data flow where the current packet belongs to the processor core whose resource usage is lower than the first threshold, when the first detection unit 52 detects that the data flow where the current packet belongs is one of the N data flows or the first determination subunit 531 determines that the internal transmission duration of the data flow where the current packet belongs in the multiprocessor core system does not exceed the duration for processing the data flow where the current packet belongs by the processor core in the multiprocessor core system, so that when the packet of the data flow where the current packet belongs enters the multiprocessor core system, it is processed by the processor core whose resource usage is lower than the first threshold.

The first threshold in the embodiment of the present invention may be set based on the actual application scenario.

Figure 8:
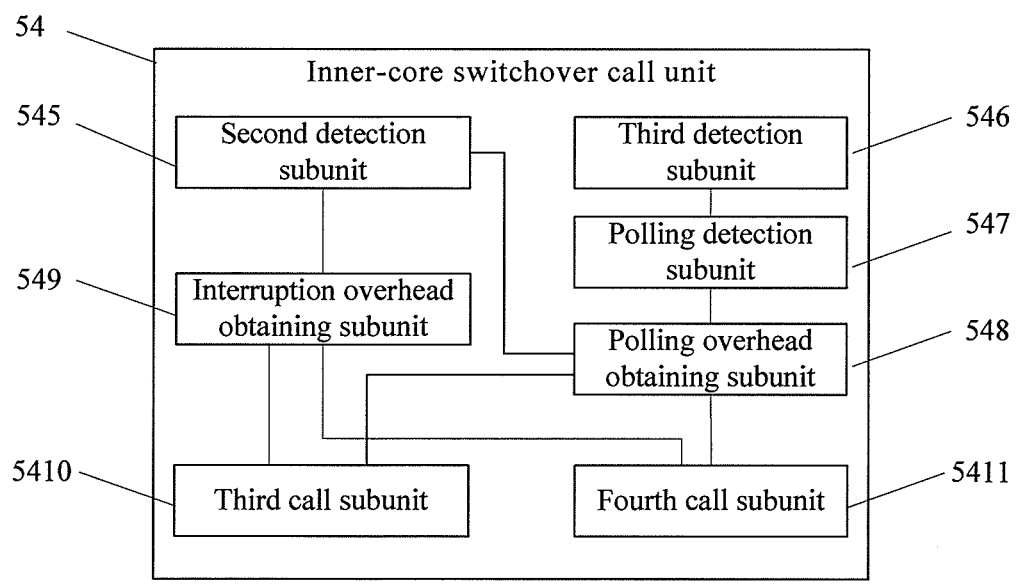
FIG. 8 is a block diagram of an intra-core switchover scheduling unit according to Embodiment 3 of the present invention.

In addition, as shown in FIG. 8, the intra-core switchover scheduling unit 54 further includes: a second detection subunit 545, a third detection subunit 546, a polling detection subunit 547, a polling overhead obtaining subunit 548, an interruption overhead obtaining subunit 549, a third scheduling subunit 5410, and a fourth scheduling subunit 5411.

The second detection subunit 545 is configured to detect, during the initialization of the multiprocessor core system, a single interruption overhead for processing each data flow in the interruption mode and detect a single polling overhead for processing each data flow in the polling mode.

The third detection subunit 546 is configured to detect, based on the APP critical path description information of each data flow, whether the data flow where the current packet belongs has a corresponding APP critical path.

The polling detection subunit 547 is configured to detect polling times in a first measurement cycle when the data flow where the current packet belongs has a corresponding APP critical path and the processor core that processes the current packet is in the polling mode;

The first measurement cycle is preset as required. It should be ensured that the packet processing frequency by the processor core is in a comparatively stable status within the first measurement cycle.

The polling overhead obtaining subunit 548 is configured to obtain an overall polling overhead based on the polling times and the single polling overhead.

The interruption overhead obtaining subunit 549 is configured to obtain an overall interruption overhead based on a predicted threshold of interruption times and the single interruption overhead.

The third scheduling subunit 5410 is configured to switch over the processor core that processes the current packet from the polling mode to the interruption mode when the overall polling overhead is greater than the overall interruption overhead.

The fourth scheduling subunit 5411 is configured to maintain the polling mode of the processor core that processes the current packet when the overall polling overhead is not greater than the overall interruption overhead.

Figure 9:
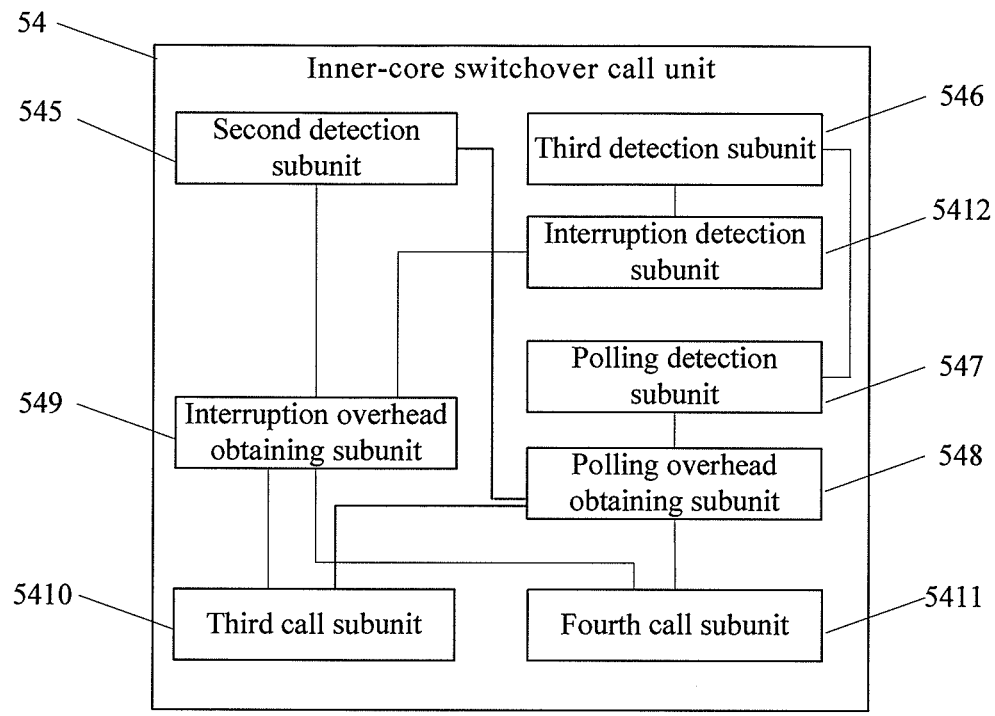
FIG. 9 is a block diagram of another intra-core switchover scheduling unit according to Embodiment 3 of the present invention.

Further, as shown in FIG. 9, the intra-core switchover scheduling unit 54 further includes: an interruption detection subunit 5412, configured to detect the interruption times in a second measurement cycle when the data flow where the current packet belongs has a corresponding APP critical path and the processor core that processes the current packet is in the interruption mode.

The second measurement cycle is preset as required. It should be ensured that the packet processing frequency by the processor core is in a comparatively stable status within the second measurement cycle. The duration of the second measurement cycle may be identical to that of the first measurement cycle.

The interruption overhead obtaining subunit 549 is further configured to obtain the overall interruption overhead based on the interruption times and the single interruption overhead.

The polling overhead obtaining subunit 548 is further configured to obtain the overall polling overhead based on the predicted threshold of polling times and the single polling overhead.

The fourth scheduling subunit 5411 is further configured to switch over the processor core that processes the current packet from the interruption mode to the polling mode when the overall interruption overhead is greater than the overall polling overhead.

The third scheduling subunit 5410 is further configured to maintain the interruption mode of the processor core that processes the current packet when the overall interruption overhead is not greater than the overall polling overhead.

Refer to Embodiment 2 of the present invention for how to set the APP critical path, which is not described herein again.

Figure 10:
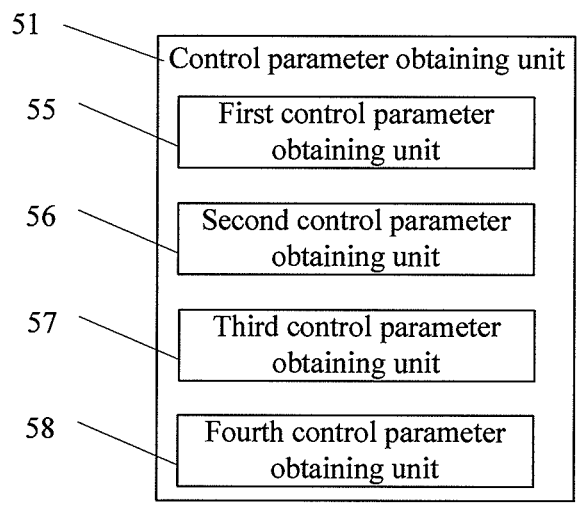
FIG. 10 is a block diagram of a control parameter obtaining unit according to Embodiment 3 of the present invention.

In addition, as shown in FIG. 10, the control parameter obtaining unit 51 includes: a first control parameter obtaining unit 55, a second control parameter obtaining unit 56, a third control parameter obtaining unit 57, and a fourth control parameter obtaining unit 58.

The first control parameter obtaining unit 55 is configured to obtain the packet processed by the multiprocessor core system in the first sampling cycle; sort the number of packets processed by the multiprocessor core system in descending order and determine, based on the relationship between the packet processed by the multiprocessor core system and the data flow where the packet belongs, the data flows containing the first N packets according to the foregoing sequence.

The second control parameter obtaining unit 56 is configured to obtain, in the running process of the multiprocessor core system, the second control parameter, where the second control parameter refers to the internal transmission duration of each data flow in the multiprocessor core system and the duration for processing each data flow by the processor core in the multiprocessor core system.

The obtaining of the second control parameter may be: for packets of different data flows, setting time tags when a packet enters the multiprocessor core system and when it leaves the multiprocessor core system to obtain the internal transmission duration of the packet in the multiprocessor core system; on the other hand, recording the time when the processor core starts to process and finishes processing the packet to obtain the duration for processing the packet by the processor core. In actual application, the internal transmission durations of a plurality of packets of a data flow and the durations for respectively processing the plurality of packets by the processor core are obtained respectively. The arithmetic means of the internal transmission durations and the durations for processing the plurality of packets by the processor core are calculated respectively as the internal transmission duration of each data flow in the multiprocessor core system and the duration for processing each data flow by the processor core. The data flows that take longer time to be processed by the processor core are bound to the processor core. This may avoid excessive inter-core switchovers and may fully utilize the calculation capability of the processor core to improve processing efficiency. The data flows whose internal transmission durations are longer are distributed to the processor core with low usage to alleviate network processing pressure.

The third control parameter obtaining unit 57 is configured to obtain, in the running process of the multiprocessor core system, the third control parameter, where the third control parameter refers to the processor core information of on the processor core with the lowest usage.

The obtaining the third control parameter may be: setting a task whose priority level is only higher than the priority level of the idle state in the multiprocessor core system, and regularly checking in which processor core this task lies, and this processor core is deemed as the processor core with the lowest usage.

The fourth control parameter obtaining unit 58 is configured to obtain the APP critical path description information of the data flow to be detected when the processing duration and processing frequency of a packet of the data flow to be detected in the multiprocessor core system exceed a processing duration threshold and a processing frequency threshold.

Figure 11A:
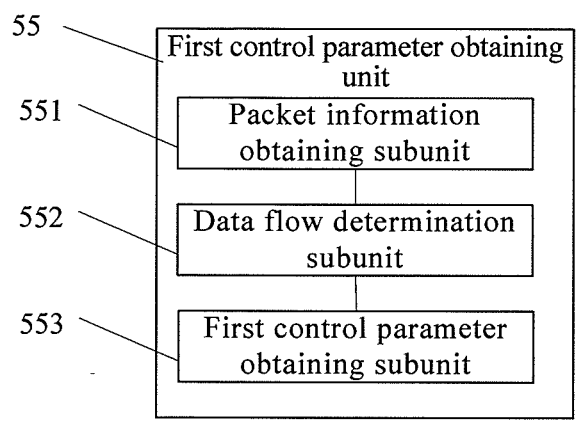
FIG. 11a is a block diagram of a first control parameter obtaining unit according to Embodiment 3 of the present invention.

Further, as shown in FIG. 11a, the first control parameter obtaining unit 55 includes: a packet information obtaining subunit 551, a data flow determination subunit 552, and a first control parameter obtaining subunit 553.

The packet information obtaining subunit 551 is configured to obtain information on the packet processed in the multiprocessor core system in the first sampling cycle.

The data flow determination subunit 552 is configured to determine the relationship between the packet processed by the multiprocessor core system and the data flow where the packet belongs.

The first control parameter obtaining subunit 553 is configured to sort the number of packets processed by the multiprocessor core system in descending order and determine, based on the relationship between the packet processed by the multiprocessor core system and the data flow where the packet belongs, the data flows containing the first N packets according to the foregoing sequence.

Figure 11B:
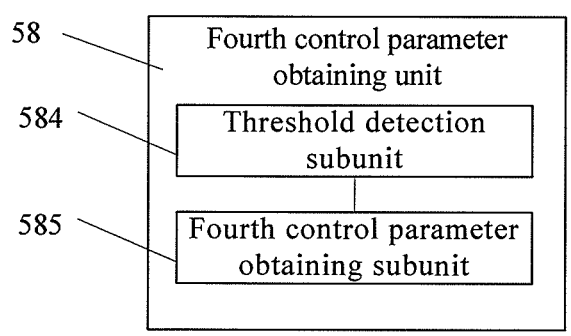
FIG. 11b is a block diagram of a fourth control parameter obtaining unit according to Embodiment 3 of the present invention.

In addition, as shown in FIG. 11b, the fourth control parameter obtaining unit 58 includes: a threshold detection subunit 584 and a fourth control parameter obtaining subunit 585.

The threshold detection subunit 584 is configured to detect, in a first detect cycle, whether the processing duration and processing frequency of the packet of the data flow to be detected exceed the processing duration threshold and the processing frequency threshold.

The fourth control parameter obtaining subunit 585 is configured to obtain the APP critical path description information of the data flow to be detected when the processing duration and processing frequency of the packet of the data flow to be detected in the multiprocessor core system exceed the processing duration threshold and the processing frequency threshold, where the APP critical path description information indicates that the data flow to be detected has an APP critical path.

In the embodiment of the present invention, the data flows are distinguished by a quintuple (a source address, a target address, a source port, a target port, and a transmission protocol of a data flow).

The processor core in the multiprocessor core system according to the embodiment of the present invention may be a CPU, an MCU, or a DSP, and so on. In the multiprocessor core system, the numerous processor cores simultaneously switch over and schedule their own intra-core and inter-core tasks.

It should be noted that, the implementation details of the apparatus for scheduling a processor core in a multiprocessor core system according to the embodiment of the present invention may be found in the description of the foregoing embodiments, which is not described herein again.

The embodiment of the present invention provides an apparatus for scheduling a processor core in a multiprocessor core system, where, by obtaining a first control parameter, a second control parameter, a third control parameter, and a fourth control parameter in the running process of the multiprocessor core system, by realizing load scheduling among a plurality of processor cores based on the first control parameter, the second control parameter, and the third control parameter, and by realizing a switchover between an interruption mode and a polling mode of a single processor core based on the fourth control parameter, the demand for real-time network I/O processing in the multiprocessor core system can be met, thereby the efficiency of the overall multiprocessor core system can be improved. The load scheduling specially contrived for a multiprocessor core environment avoids the problem that in a traditional configuration scheduling mode, it is difficult to make a reasonable scheduling selection so that the efficiency and capability of a multiprocessor core fail to be fully utilized. In addition, this method simplifies the manual configuration of the network I/O of the multiprocessor core by an engineer or a subscriber, which improves the software deployment efficiency on a multicore platform.

Embodiment 4

Figure 12:
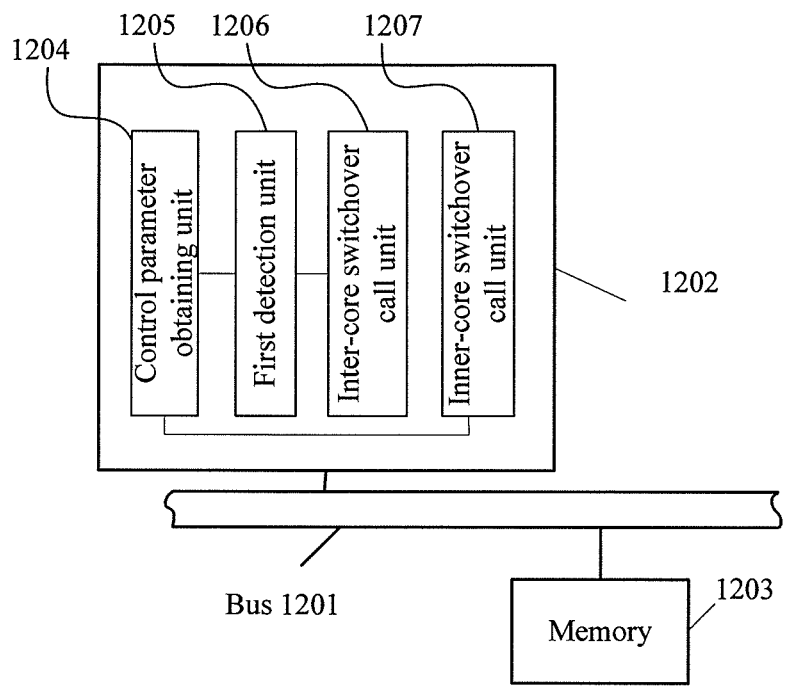
FIG. 12 is a schematic diagram of a computer system according to Embodiment 4 of the present invention.

An embodiment of the present invention also provides a computer system, as shown in FIG. 12, including:
a bus 1201;
a multiprocessor core coupled with the bus 1202; and
a memory coupled with the bus 1203, where
the multiprocessor core 1202 includes anyone of the apparatuses in Embodiment 3.

In FIG. 12, the multiprocessor core 1202 includes a control parameter obtaining unit 1204, a first detection unit 1205, an inter-core switchover scheduling unit 1206, and an intra-core switchover scheduling unit 1207.

The embodiment of the present invention provides a computer system, where, by obtaining a first control parameter, a second control parameter, a third control parameter, and a fourth control parameter in the running process of a computer system formed by a multiprocessor core, by realizing load scheduling among a plurality of processor cores based on the first control parameter, the second control parameter, and the third control parameter, and by realizing a switchover between an interruption mode and a polling mode of a single processor core based on the fourth control parameter, the demand for real-time network I/O processing in the multiprocessor core system can be met, thereby the efficiency of the overall computer system can be improved. The load scheduling specially contrived for a multiprocessor core environment avoids the problem that in a traditional configuration scheduling mode, it is difficult to make a reasonable scheduling selection so that the efficiency and capability of a multiprocessor core fail to be fully utilized. In addition, this method simplifies the manual configuration of the network I/O of the multiprocessor core by an engineer or a subscriber, which improves the software deployment efficiency on a multicore platform.

Embodiment 5

Figure 13:
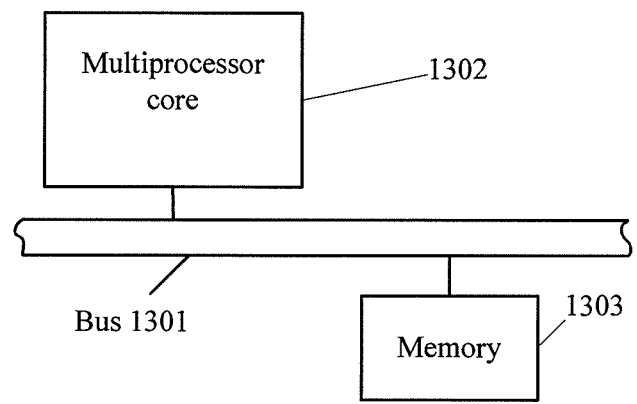
FIG. 13 is a schematic diagram of a computer system according to Embodiment 5 of the present invention.

An embodiment of the present invention provides a computer system, as shown in FIG. 13, including:
a bus;
a multiprocessor core coupled with the bus; and
a memory coupled with the bus, where by calling an execution instruction in the memory 1303 through the bus 1301, the multiprocessor core 1302 is configured to: obtain a first control parameter, a second control parameter, a third control parameter, and a fourth control parameter based on the data called from the memory 1303, and the memory 1303 may be a memory, a hard disk device, or a flash memory (flash memory), where the first control parameter refers to indication information of the N data flows, and the N data flows refer to the first N data flows obtained in a first sampling cycle by sorting data flows, which contain packets processed by the multiprocessor core system, in descending order according to the number of the processed packets contained in each data flow, where N is a positive integer; the second control parameter refers to an internal transmission duration of each data flow in the multiprocessor core system and a duration for processing each data flow by a processor core in the multiprocessor core system; the third control parameter refers to processor core information of the processor core with the lowest usage; and the fourth control parameter refers to APP critical path description information of each data flow.

The multiprocessor core 1302 is further configured to detect whether a data flow where a current packet belongs is one of the N data flows based on the first control parameter.

The multiprocessor core 1302 is further configured to: when the data flow where the current packet belongs is not one of the N data flows, transfer, based on the second control parameter and the third control parameter and according to an inter-core switchover policy, the packet of the data flow that enters the multiprocessor core system to an idle processor core for processing, where inter-core switchover policy is that: if the internal transmission duration of a packet exceeds a duration for processing the packet by the processor core, the packet is processed by the processor core with the lowest usage, and if the duration for processing a packet by the processor core exceeds the internal transmission duration of the packet, the packet is bound to a designated processor core for processing.

The multiprocessor core 1302 is further configured to switch over the processor core that processes the packet in the computer system formed by the multiprocessor core 1302 between an interruption mode and an polling mode based on the fourth control parameter and according to an intra-core switchover policy, where the intra-core switchover policy is that: if the overall polling overhead is greater than the overall interruption overhead, the processor core enters the interruption mode to process the packet, and if the overall polling overhead is less than the overall interruption overhead, the processor core enters the polling mode to process the packet.

The multiprocessor core according to the embodiment of the present invention may be a processor core in a single-core processor or a processor core in a multi-core processor. For example, it is feasible that the kernels of a plurality of processors are encapsulated in an encapsulation structure, as shown in FIG. 13. In the foregoing computer system, there may be a plurality of encapsulation structures and each encapsulation structure is encapsulated with a plurality of processor kernels.

The embodiment of the present invention provides a computer system, where, by obtaining a first control parameter, a second control parameter, a third control parameter, and a fourth control parameter in the running process of a computer system formed by a multiprocessor core, by realizing load scheduling among a plurality of processor cores based on the first control parameter, the second control parameter, and the third control parameter, and by realizing a switchover between an interruption mode and a polling mode of a single processor core based on the fourth control parameter, the demand for real-time network I/O processing in the computer system formed by a multiprocessor core can be met, thereby the efficiency of the overall computer system can be improved. The load scheduling specially contrived for a multiprocessor core environment avoids the problem that in a traditional configuration scheduling mode, it is difficult to make a reasonable scheduling selection so that the efficiency and capability of a multiprocessor core fail to be fully utilized. In addition, this method simplifies the manual configuration of the network I/O of the multiprocessor core by an engineer or a subscriber, which improves the software deployment efficiency on a multicore platform.

A person of ordinary skill in the art may understand that, all or a part of the steps of the methods in the embodiments may be implemented by a program instructing relevant hardware. The foregoing program may be stored in a computer readable storage medium. When the program runs, the preceding steps included in the method embodiments are performed; and the foregoing storage medium may be any medium capable of storing program codes, such as a ROM, a RAM, a magnetic disk, or an optical disk.

It should be noted that, the expressions, first, second, third, and fourth used in the description of the embodiments are not intended to limit a sequence. Instead, they are only used for distinguishing.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for scheduling a processor core in a multiprocessor core system, the method comprising:

obtaining, in the running process of the multiprocessor core system, a first control parameter, a second control parameter, a third control parameter, and a fourth control parameter, wherein:

the first control parameter refers to indication information of N data flows, and the N data flows refer to the first N data flows obtained in a first sampling cycle by sorting data flows, which contain packets processed by the multiprocessor core system, in descending order according to the number of the processed packets contained in each data flow, where N is a positive integer, the second control parameter refers to an internal transmission duration of each data flow in the multiprocessor core system and a duration for processing each data flow by a processor core in the multiprocessor core system, the third control parameter refers to processor core information of the processor core with the lowest usage, and the fourth control parameter refers to application (APP) critical path description information of each data flow;

detecting whether a data flow where a current packet belongs is one of the N data flows based on the first control parameter;

when the data flow where the current packet belongs is not one of the N data flows, transferring, based on the second control parameter and the third control parameter and according to an inter-core switchover policy, a packet of the data flow that enters the multiprocessor core system to an idle processor core for processing, wherein the inter-core switchover policy is that: if the internal transmission duration of a packet exceeds a duration for processing the packet by the processor core, the packet is processed by the processor core with the lowest usage, and if the duration for processing a packet by the processor core exceeds the internal transmission duration of the packet, the packet is bound to a designated processor core for processing; and switching over the processor core that processes the packet in the multiprocessor core system between an interruption mode and a polling mode based on the fourth control parameter and according to an intra-core switchover policy, wherein the intra-core switchover policy is that: if the overall polling overhead is greater than the overall interruption overhead, the processor core enters the interruption mode to process the packet, and if the overall polling overhead is less than the overall interruption overhead, the processor core enters the polling mode to process the packet.

2. The method according to claim 1, wherein transferring, based on the second control parameter and the third control parameter and according to an inter-core switchover policy, a packet of the data flow that enters the multiprocessor core system to an idle processor core for processing comprises:

determining, based on the second control parameter, whether the internal transmission duration of the data flow where the current packet belongs in the multiprocessor core system exceeds the duration for processing the data flow where the current packet belongs by the processor core in the multiprocessor core system; and distributing, based on the third control parameter, the current packet to the processor core with the lowest usage in the multiprocessor core system, if the internal transmission duration of the data flow where the current packet belongs in the multiprocessor core system exceeds the duration for processing the data flow where the current packet belongs by the processor core in the multiprocessor core system.

3. The method according to claim 2, further comprising:
when the data flow where the current packet belongs is one of the N data flows or the internal transmission duration of the data flow where the current packet belongs in the multiprocessor core system does not exceed the duration for processing the data flow where the current packet belongs by the processor core in the multiprocessor core system, transmitting, the current packet to the processor core whose resource usage is lower than the first threshold, and binding the data flow where the current packet belongs to the processor core whose resource usage is lower than the first threshold, so that when the packet of the data flow where the current packet belongs enters the multiprocessor core system, it is processed by the processor core whose resource usage is lower than the first threshold.

4. The method according to claim 1, wherein switching over the processor core that processes the packet in the multiprocessor core system between an interruption mode and a polling mode based on the fourth control parameter and according to an intra-core switchover policy comprises:

detecting, during the initialization of the multiprocessor core system, a single interruption overhead for processing each data flow in the interruption mode and detecting a single polling overhead for processing each data flow in the polling mode;

detecting, based on the APP critical path description information of each data flow, whether the data flow where the current packet belongs has a corresponding APP critical path;

detecting polling times in the first measurement cycle if the data flow where the current packet belongs has a corresponding APP critical path and the processor core that processes the current packet is in the polling mode;

obtaining an overall polling overhead based on the polling times and the single polling overhead;

obtaining an overall interruption overhead based on a predicted threshold of the interruption times and the single interruption overhead;

switching over the processor core that processes the current packet from the polling mode to the interruption mode when the overall polling overhead is greater than the overall interruption overhead; and maintaining the polling mode of the processor core that processes the current packet when the overall polling overhead is not greater than the overall interruption overhead.

5. The method according to claim 4, further comprising:
detecting the interruption times in a second measurement cycle if the data flow where the current packet belongs has a corresponding APP critical path and the processor core that processes the current packet is in the interruption mode;

obtaining the overall interruption overhead based on the interruption times and the single interruption overhead;

obtaining the overall polling overhead based on the predicted threshold of the polling times and the single polling overhead;

switching over the processor core that processes the current packet from the interruption mode to the polling mode when the overall interruption overhead is greater than the overall polling overhead; and maintaining the interruption mode of the processor core that processes the current packet when the overall interruption overhead is not greater than the overall polling overhead.

6. The method according to claim 1, wherein obtaining a first control parameter comprises:

obtaining the packet processed by the multiprocessor core system in the first sampling cycle;

determining the relationship between the packet processed by the multiprocessor core system and the data flow where the packet belongs; and sorting the number of packets processed by the multiprocessor core system in descending order and determining, based on the relationship between the packet processed by the multiprocessor core system and the data flow where the packet belongs, the data flows containing the first N packets according to the foregoing sequence.

7. The method according to claim 1, wherein obtaining a fourth control parameter comprises:

detecting, in a first detect cycle, whether the processing duration and processing frequency of a packet of the data flow to be detected exceed a processing duration threshold and a processing frequency threshold; and obtaining the APP critical path description information of the data flow to be detected when the processing duration and processing frequency of the packet of the data flow to be detected in the multiprocessor core system exceed the processing duration threshold and the processing frequency threshold, wherein the APP critical path description information indicates that the data flow to be detected has an APP critical path.

8. The method according to claim 7, wherein detecting whether the processing duration and processing frequency of the packet of the data flow to be detected exceed a processing duration threshold and a processing frequency threshold comprises:

enabling a function processing counter and a frequency counter;

adding one to the value of the function processing counter whenever the packet of the data flow to be detected is processed by the current function module;

detecting whether the value of the function processing counter is greater than the processing duration threshold;

adding one to the value of the frequency counter when the value of the function processing counter is greater than the processing duration threshold; resetting the function processing counter; and detecting whether the value of the frequency counter is greater than the processing frequency threshold;

and the obtaining the APP critical path description information of the data flow to be detected specifically comprises:

obtaining the APP critical path description information for the data flow containing the corresponding packet whose value of the frequency counter is greater than the processing frequency threshold when the value of the frequency counter is greater than the processing frequency threshold.

9. A computer system, comprising:

a bus;

a multiprocessor core coupled with the bus; and a memory coupled with the bus, wherein:

by calling an execution instruction in the memory through the bus, the multiprocessor core is configured to: obtain a first control parameter, a second control parameter, a third control parameter, and a fourth control parameter based on the data called from the memory, wherein:

the first control parameter refers to indication information of N data flows, and the N data flows refer to the first N data flows obtained in a first sampling cycle by sorting data flows, which contain packets processed by the multiprocessor core system, in descending order according to the number of the processed packets contained in each data flow, wherein N is a positive integer, the second control parameter refers to an internal transmission duration of each data flow in the multiprocessor core system and a duration for processing each data flow by a processor core in the multiprocessor core system, the third control parameter refers to processor core information of the processor core with the lowest usage, and the fourth control parameter refers to application (APP) critical path description information of each data flow;

the multiprocessor core is further configured to detect whether a data flow where a current packet belongs is one of the N data flows based on the first control parameter;

the multiprocessor core is further configured to: when the data flow where the current packet belongs is not one of the N data flows, transfer, based on the second control parameter and the third control parameter and according to an inter-core switchover policy, the packet of the data flow that enters the multiprocessor core system to an idle processor core for processing, wherein the inter-core switchover policy is that: if the internal transmission duration of a packet exceeds a duration for processing the packet by the processor core, the packet is processed by the processor core with the lowest usage, and if the duration for processing a packet by the processor core exceeds the internal transmission duration of the packet, the packet is bound to a designated processor core for processing; and the multiprocessor core is further configured to switch over the processor core that processes the packet in the multiprocessor core system between an interruption mode and a polling mode based on the fourth control parameter and according to an intra-core switchover policy, wherein the intra-core switchover policy is that: if the overall polling overhead is greater than the overall interruption overhead, the processor core enters the interruption mode to process the packet, and if the overall polling overhead is less than the overall interruption overhead, the processor core enters the polling mode to process the packet.

10. The computer system according to claim 9, wherein in the process of when the first detection unit detects that the data flow where the current packet belongs is not one of the N data flows, transfer, based on the second control parameter and the third control parameter and according to an inter-core switchover policy, the packet of the data flow that enters the multiprocessor core system to an idle processor core for processing, wherein the inter-core switchover policy is that: if the internal transmission duration of a packet exceeds a duration for processing the packet by the processor core, the packet is processed by the processor core with the lowest usage, and if the duration for processing a packet by the processor core exceeds the internal transmission duration of the packet, the packet is bound to a designated processor core for processing, the multiprocessor core is further configured to:

determine, based on the second control parameter, whether the internal transmission duration of the data flow where the current packet belongs in the multiprocessor core system exceeds the duration for processing the data flow where the current packet belongs by the processor core in the multiprocessor core system; and distribute, based on the third control parameter, the current packet to the processor core with the lowest usage in the multiprocessor core system when the first detection unit detects that the data flow where the current packet belongs is not one of the N data flows and the internal transmission duration of the data flow where the current packet belongs in the multiprocessor core system exceeds the duration for processing the data flow where the current packet belongs by the processor core in the multiprocessor core system.

11. The computer system according to claim 10, wherein the multiprocessor core is further configured to:

transmit the current packet to the processor core whose resource usage is lower than the first threshold and bind the data flow where the current packet belongs to the processor core whose resource usage is lower than the first threshold when the first detection unit detects that the data flow where the current packet belongs is one of the N data flows or the first determination subunit determines that the internal transmission duration of the data flow where the current packet belongs in the multiprocessor core system does not exceed the duration for processing the data flow where the current packet belongs by the processor core in the multiprocessor core system, so that when the packet of the data flow where the current packet belongs enters the multiprocessor core system, it is processed by the processor core whose resource usage is lower than the first threshold.

12. The computer system according to claim 9, wherein in the process of switch over the processor core that processes the packet in the multiprocessor core system between an interruption mode and a polling mode based on the fourth control parameter and according to an intra-core switchover policy, wherein the intra-core switchover policy is that: if the overall polling overhead is greater than the overall interruption overhead, the processor core enters the interruption mode to process the packet, and if the overall polling overhead is less than the overall interruption overhead, the processor core enters the polling mode to process the packet, the multiprocessor core is further configured to:

detect, during the initialization of the multiprocessor core system, a single interruption overhead for processing each data flow in the interruption mode and detect a single polling overhead for processing each data flow in the polling mode;

detect, based on the APP critical path description information of each data flow, whether the data flow where the current packet belongs has a corresponding APP critical path;

detect polling times in a first measurement cycle when the data flow where the current packet belongs has a corresponding APP critical path and the processor core that processes the current packet is in the polling mode;

obtain an overall polling overhead based on the polling times and the single polling overhead;

obtain an overall interruption overhead based on a predicted threshold of interruption times and the single interruption overhead;

switch over the processor core that processes the current packet from the polling mode to the interruption mode when the overall polling overhead is greater than the overall interruption overhead; and maintain the polling mode of the processor core that processes the current packet when the overall polling overhead is not greater than the overall interruption overhead.

13. The computer system according to claim 12, wherein the multiprocessor core is further configured to:

detect the interruption times in a second measurement cycle when the data flow where the current packet belongs has a corresponding APP critical path and the processor core that processes the current packet is in the interruption mode;

obtain the overall interruption overhead based on the interruption times and the single interruption overhead;

obtain the overall polling overhead based on the predicted threshold of polling times and the single polling overhead;

switch over the processor core that processes the current packet from the interruption mode to the polling mode when the overall interruption overhead is greater than the overall polling overhead; and maintain the interruption mode of the processor core that processes the current packet when the overall interruption overhead is not greater than the overall polling overhead.

14. The computer system according to claim 9, wherein in the process of obtain, in the running process of the multiprocessor core system, a first control parameter, a second control parameter, a third control parameter, and a fourth control parameter, wherein the first control parameter refers to indication information of N data flows, and the N data flows refer to the first N data flows obtained in a first sampling cycle by sorting data flows, which contain packets processed by the multiprocessor core system, in descending order according to the number of the processed packets contained in each data flow, wherein N is a positive integer; the second control parameter refers to an internal transmission duration of each data flow in the multiprocessor core system and a duration for processing each data flow by a processor core in the multiprocessor core system; the third control parameter refers to processor core information of the processor core with the lowest usage; and the fourth control parameter refers to application (APP) critical path description information of each data flow, the multiprocessor core is further configured to:

obtain the packet processed by the multiprocessor core system in the first sampling cycle; sort the number of packets processed by the multiprocessor core system in descending order and determine, based on the relationship between the packet processed by the multiprocessor core system and the data flow where the packet belongs, the data flows containing the first N packets according to the foregoing sequence;

obtain, in the running process of the multiprocessor core system, the second control parameter, wherein the second control parameter refers to the internal transmission duration of each data flow in the multiprocessor core system and the duration for processing each data flow by the processor core in the multiprocessor core system;

obtain, in the running process of the multiprocessor core system, the third control parameter, wherein the third control parameter refers to the processor core information of the processor core with the lowest usage; and obtain the APP critical path description information of the data flow to be detected when the processing duration and processing frequency of a packet of the data flow to be detected in the multiprocessor core system exceed a processing duration threshold and a processing frequency threshold.

15. The computer system according to claim 14, wherein in the process of obtain the packet processed by the multiprocessor core system in the first sampling cycle; sort the number of packets processed by the multiprocessor core system in descending order and determine, based on the relationship between the packet processed by the multiprocessor core system and the data flow where the packet belongs, the data flows containing the first N packets according to the foregoing sequence, the multiprocessor core is further configured to:

obtain the packet processed by the multiprocessor core system in the first sampling cycle;

determine the relationship between the packet processed by the multiprocessor core system and the data flow where the packet belongs; and sort the number of packets processed by the multiprocessor core system in descending order and determine, based on the relationship between the packet processed by the multiprocessor core system and the data flow where the packet belongs, the data flows containing the first N packets according to the foregoing sequence.

16. The computer system according to claim 14, wherein in the process of obtain the APP critical path description information of the data flow to be detected when the processing duration and processing frequency of a packet of the data flow to be detected in the multiprocessor core system exceed a processing duration threshold and a processing frequency threshold, the multiprocessor core is further configured to:

detect, in a first detect cycle, whether the processing duration and processing frequency of the packet of the data flow to be detected exceed the processing duration threshold and the processing frequency threshold; and obtain the APP critical path description information of the data flow to be detected when the threshold detection subunit detects that the processing duration and processing frequency of the packet of the data flow to be detected in the multiprocessor core system exceed the processing duration threshold and the processing frequency threshold, wherein the APP critical path description information indicates that the data flow to be detected has an APP critical path.

17. A non-transitory computer readable medium having computer executable instructions for performing a method for scheduling a processor core in a multiprocessor core system, comprising:

obtaining, in the running process of the multiprocessor core system, a first control parameter, a second control parameter, a third control parameter, and a fourth control parameter, wherein:

the first control parameter refers to indication information of N data flows, and the N data flows refer to the first N data flows obtained in a first sampling cycle by sorting data flows, which contain packets processed by the multiprocessor core system, in descending order according to the number of the processed packets contained in each data flow, where N is a positive integer, the second control parameter refers to an internal transmission duration of each data flow in the multiprocessor core system and a duration for processing each data flow by a processor core in the multiprocessor core system, the third control parameter refers to processor core information of the processor core with the lowest usage, and the fourth control parameter refers to application (APP) critical path description information of each data flow;

detecting whether a data flow where a current packet belongs is one of the N data flows based on the first control parameter;

when the data flow where the current packet belongs is not one of the N data flows, transferring, based on the second control parameter and the third control parameter and according to an inter-core switchover policy, a packet of the data flow that enters the multiprocessor core system to an idle processor core for processing, wherein the inter-core switchover policy is that: if the internal transmission duration of a packet exceeds a duration for processing the packet by the processor core, the packet is processed by the processor core with the lowest usage, and if the duration for processing a packet by the processor core exceeds the internal transmission duration of the packet, the packet is bound to a designated processor core for processing; and switching over the processor core that processes the packet in the multiprocessor core system between an interruption mode and a polling mode based on the fourth control parameter and according to an intra-core switchover policy, wherein the intra-core switchover policy is that: if the overall polling overhead is greater than the overall interruption overhead, the processor core enters the interruption mode to process the packet, and if the overall polling overhead is less than the overall interruption overhead, the processor core enters the polling mode to process the packet.

\* \* \* \* \*